(12) United States Patent
Zulauf et al.

(10) Patent No.: US 6,474,312 B1
(45) Date of Patent: Nov. 5, 2002

(54) VAPOR-ADSORBENT UNDERHOOD BLANKET, SYSTEM AND METHOD OF REDUCING EVAPORATIVE FUEL EMISSIONS FROM A VEHICLE

(75) Inventors: Gary Zulauf, Findlay, OH (US); Ronald P. Rohrbach, Flemington, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/974,006

(22) Filed: Oct. 10, 2001

(51) Int. Cl.[7] .............................................. F02M 37/04
(52) U.S. Cl. ........................ 123/518; 123/519; 123/520
(58) Field of Search ................................ 123/516, 518, 123/519, 520

(56) References Cited

U.S. PATENT DOCUMENTS

| | | | |
|---|---|---|---|
| 3,728,846 A | | 4/1973 | Nilsson |
| 4,133,762 A | | 1/1979 | Visceglia et al. |
| 4,817,576 A | * | 4/1989 | Abe et al. ................. 123/519 |
| 4,869,739 A | * | 9/1989 | Kanome et al. ........... 123/519 |
| 4,925,465 A | | 5/1990 | Liskey |
| 5,056,494 A | * | 10/1991 | Kayanuma ................. 123/519 |
| 5,350,513 A | * | 9/1994 | Markowitz .................. 210/264 |
| 5,429,099 A | | 7/1995 | DeLand |
| 5,453,118 A | | 9/1995 | Heiligman |
| 5,704,966 A | | 1/1998 | Rohrbach et al. |
| 5,744,236 A | | 4/1998 | Rohrbach et al. |
| 5,891,221 A | | 4/1999 | Rohrbach et al. |
| 5,912,368 A | | 6/1999 | Satarino et al. |
| 5,951,744 A | | 9/1999 | Rohrbach et al. |
| 6,004,381 A | | 12/1999 | Rohrbach et al. |
| 6,048,614 A | | 4/2000 | Rohrbach et al. |
| 6,117,802 A | | 9/2000 | Rohrbach et al. |
| 6,127,036 A | | 10/2000 | Xue et al. |

* cited by examiner

*Primary Examiner*—Thomas N. Moulis

(57) ABSTRACT

A filter blanket, for placement on an underside of a vehicle hood, and for use in recycling residual engine vapors from within an engine's intake system, includes a filter element and a cover. The filter element includes a plurality of wicking fibers. Each of the wicking fibers has an internal cavity formed therein, and a longitudinally extending slot formed therein extending from the internal cavity to the outer fiber surface. The filter blanket also includes a hydrocarbon-absorbing material disposed within the internal cavities of the fibers. The filter blanket may be used in conjunction with a routing duct, as part of a fuel vapor recycling system.

19 Claims, 7 Drawing Sheets

VAPOR-ADSORBENT UNDERHOOD BLANKET, SYSTEM AND METHOD OF REDUCING EVAPORATIVE FUEL EMISSIONS FROM A VEHICLE

BACKGROUND OF THE INVENTION

1. Field of the Invention

The present invention relates to a vapor-adsorbent blanket or pad for capturing evaporative fuel emissions from an internal combustion engine. More particularly, the present invention relates to an underhood blanket for placement on a lower surface of a vehicle hood, to adsorb evaporative emissions from an engine, particularly after the engine has been turned off.

2. Description of the Background Art

The great majority of internal combustion engines in use today are fuel-injected engines. When a fuel-injected engine is switched off after use, a small amount of residual fuel volatilizes and escapes from the injector tips. Other volatile gases may be present within the intake system after vehicle shutoff, such as blowby vapors, hot oil fumes, etc.

While a vehicle is sitting parked after use, some of this volatile evaporated fuel and other fumes may pass outwardly through the intake manifold, the intake air ducting and air filter, and may escape into the atmosphere, thus contributing to air pollution. It would be desirable to minimize this type of inadvertent evaporative emissions leakage.

Some efforts have been made to address this problem.

U.S. Pat. No. 4,261,717 to Belore et al. discloses an air cleaner having a 'trap door' valve mechanism in the snorkel thereof. When the engine is turned off, this valve closes, preventing internal engine vapors from passing outwardly through the air cleaner. The filter element inside the air cleaner housing includes a charcoal-impregnated pleated paper element for adsorbing engine vapors during engine shutoff, and for releasing those vapors when normal airflow resumes during engine operation.

Many different types of filters are known for use in filtering evaporative fuel emissions in specific applications. Examples of some of the known filter types are described in U.S. Pat. No. 3,728,846, 4,133,762, 4,925,465, 5,429,099, 5,453,118, and 5,912,368.

Insulating under-hood pads or blankets are used on most vehicles, and are attached to the lower surface of the vehicle hood, to retain heat within the engine compartment, and to protect the hood from damage or discoloration from the heat of the engine compartment.

U.S. Pat. No. 4,925,465 to Liskey, issued May 15, 1990, discloses a vapor-recovery canister provided in the form of an under-hood blanket. The vapor-recovery canister of Liskey includes a flexible, sealed envelope for placement below a vehicle hood. An insulating material, impregnated with charcoal granules, is provided within the envelope as a hydrocarbon adsorbent. Separate conduits connect the envelope to a vehicle carburetor and to a gas tank fuel neck. Also in the design of Liskey, a reversible pump may be provided in communication with the envelope, to draw vapors from the carburetor and from the fuel neck into the envelope. The same pump may be reversed to provide pressurized air to the envelope.

The assignee of the present invention has developed a new type of 'wicking' fiber material that has been used for some filter applications. This material includes hollow spaces within the individual fibers, and this hollow space may be used to house a reactive or adsorbent material. Some issued patents relating to this wicking fiber, and to filters containing this type of fiber include U.S. Pat. No. 5,057,368, 5,704,966, 5,713,971, 5,744,236, 5,759,394, 5,891,221, 5,902,384, 5,951,744, 6,004,381, 6,048,614, 6,117,802, and 6,127,036. Other patents using this fiber technology are pending.

Although the known devices are useful for their intended purposes, a need still exists in the art for an improved evaporative emissions filter, adapted to adsorb engine vapors within an engine, subsequent to the engine being turned off. Preferably, such a filter would be capable of regeneration, so as to be repeatably usable over many cycles of engine operation.

SUMMARY OF THE INVENTION

The present invention provides a filter blanket for placement on a lower surface of a vehicle hood, and for use in removing residual engine vapors from within an engine's intake system, after the engine has been turned off. The filter blanket includes materials which are adapted to adsorb, and to selectively release engine vapors directed thereto.

The present invention also relates to a method of removing engine vapors from a vehicle's intake system, after the engine has been turned off, and drawing those vapors into the engine when it is re-started.

A filter blanket in accordance with the present invention, generally, includes:
 a filter element for placement on an underside of a vehicle hood, said filter element comprising a plurality of fibers and comprising a hydrocarbon-adsorbent material; and
 a cover for placement below the filter element, the cover having a plurality of apertures formed therein for transmitting fresh air into the filter element.

In one particular embodiment of the invention, the filter element comprises a plurality of wicking fibers;
 each of the wicking fibers having an outer surface;
 each of the wicking fibers further having a longitudinally extending internal cavity formed therein, and having a longitudinally extending slot formed therein extending from the internal cavity to the outer fiber surface; and
 wherein the filter further comprises a hydrocarbon-adsorbing material disposed within the internal cavities of the fibers.

The hydrocarbon-adsorbing material may include a solid material such as, e.g., activated carbon.

The hydrocarbon-adsorbing material may include a liquid such as a relatively non-volatile organic solvent. Suitable organic solvents, which may be used in the fiber cavities, include mineral oils and paraffin oils.

Optionally, if desired, the hydrocarbon-adsorbing material may include both a solid and a liquid surrounding the solid particles in the internal cavities of the wicking fibers.

In one embodiment of the invention, each of the wicking fibers includes a central stem and a plurality of lobes extending outwardly from the central stem, with each lobe having a longitudinally extending internal cavity on each side thereof, whereby a longitudinally extending slot is defined between adjacent lobes.

The filter element may also comprise a plurality of other, different fibers intermingled with the wicking fibers. Optionally, the filter blanket may include additional fibers selected for their sound-dampening capability, for their insulating properties, for their heat-resistant ability, and/or for other properties. By way of example, the filter blanket may contain glass fibers.

The present invention further includes a system including an underhood blanket comprising a fuel vapor-adsorbent material, and a duct for routing vapors from an intake system to said blanket, the duct including first and second variably adjustable valves therein. The system may further include an electronic controller for controlling operation of the first and second valves.

The present invention still further includes a method of entrapping and recycling engine vapors from a vehicle's intake system.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

Figure 1:
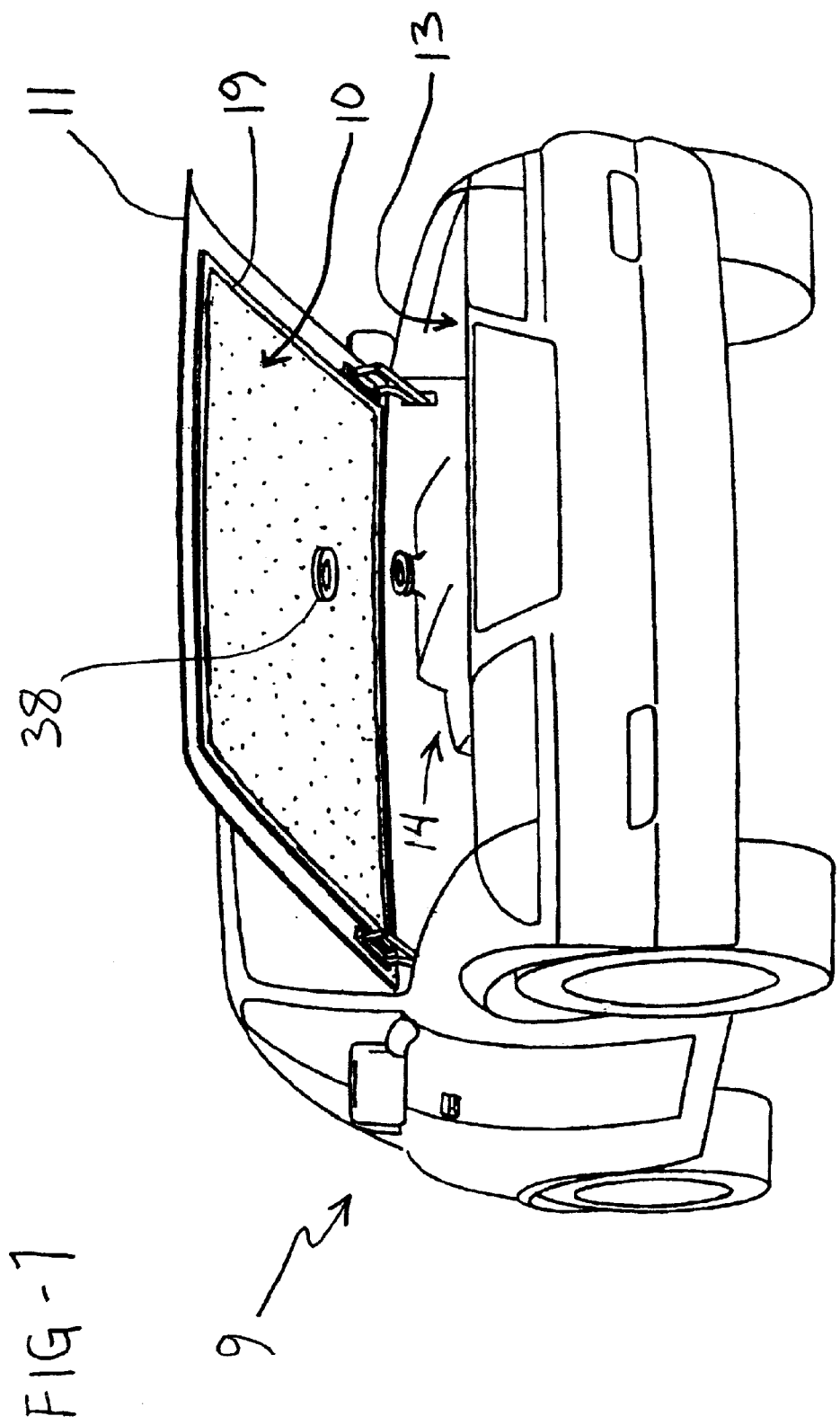
FIG. 1 is a perspective view of a vehicle showing the hood in an open position thereof, and showing a filter blanket thereon according to a first embodiment of the invention.
Figure 2:
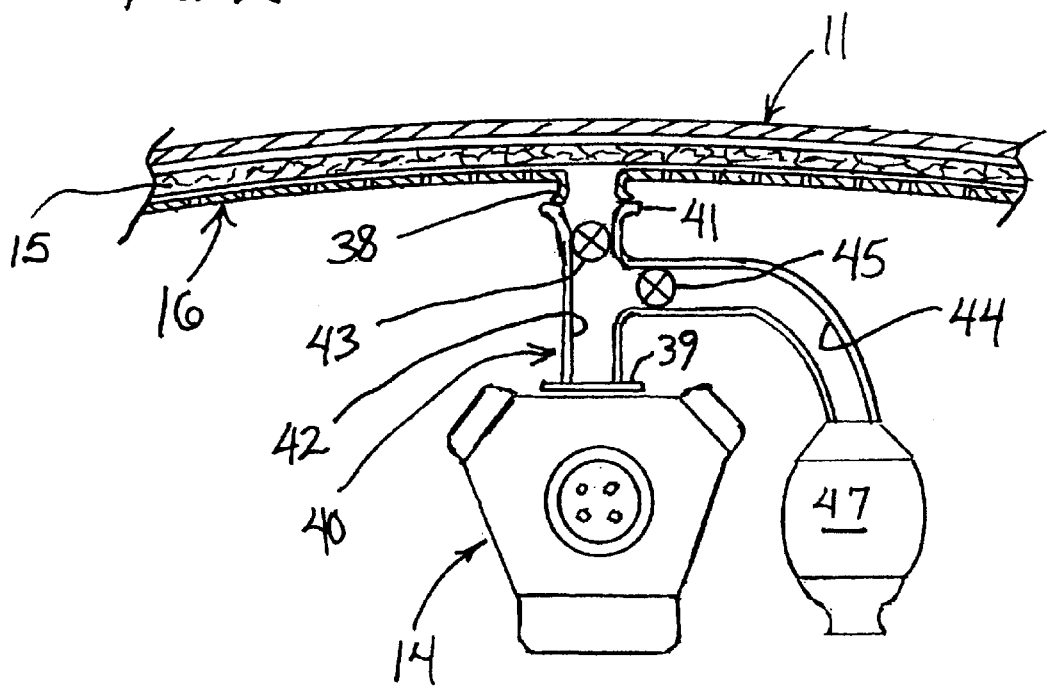
FIG. 2 is a cross-sectional view of the vehicle hood and filter blanket of FIG. 1, also showing a duct for controlling air flow to the engine.
Figure 2A:
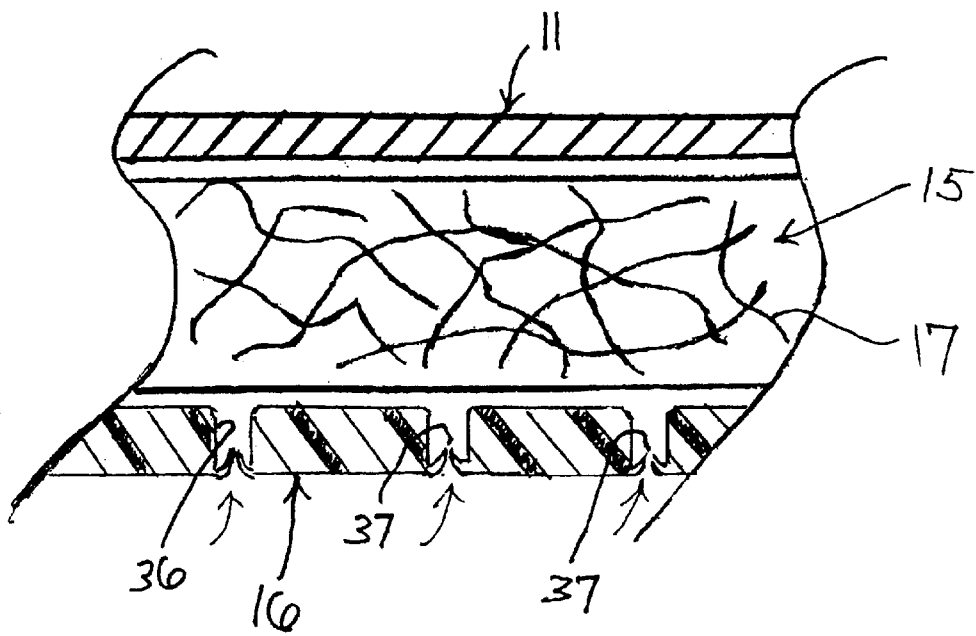
FIG. 2A is a detail view of FIG. 2, showing a nonwoven fiber mat and cover construction for the filter blanket.

Referring now to FIGS. 1–2A of the drawings, a filter blanket in accordance with a first embodiment of the invention is shown generally at 10, mounted on a vehicle 9. The filter blanket 10 is provided for placement on a lower surface of a vehicle hood 11, so that the blanket will be situated above an engine compartment 13 when the hood is closed. The filter blanket 10 is fixed in place on the underside of the vehicle hood 11 by any suitable means of attachment.

The filter blanket 10 serves to insulate, to deaden sound, and to adsorb engine vapors which may be released from an internal combustion engine 14, as will be further detailed hereinbelow.

As shown in FIGS. 2–2A, the filter blanket 10 includes a main filter element 15, and a cover 16 for protectively covering the filter element 15.

The filter element 15 includes a porous non-woven fiber web 12 made up of multiple randomly intertwined fibers 17.

The filter element 15 further has an adsorbent material associated therewith, which preferably includes activated carbon. The adsorbent material may be interspersed between and among the fibers 17, and/or may be entrapped within cavities of some of the fibers, as will be further detailed herein.

Figure 3:
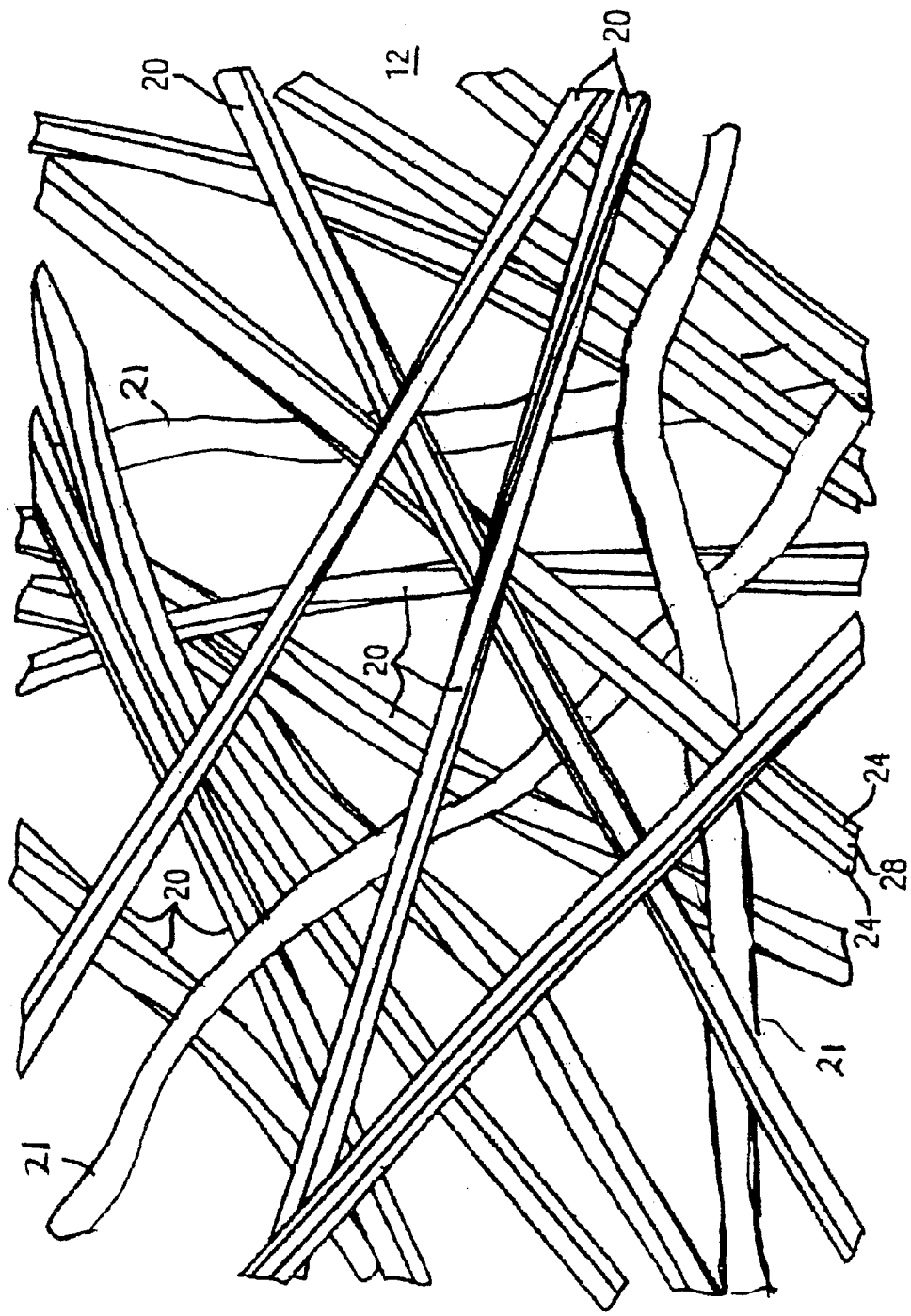
FIG. 3 is an enlarged perspective detail view of the nonwoven fiber mat of FIG. 2, formed of wicking fibers according to the present invention.
Figure 4:
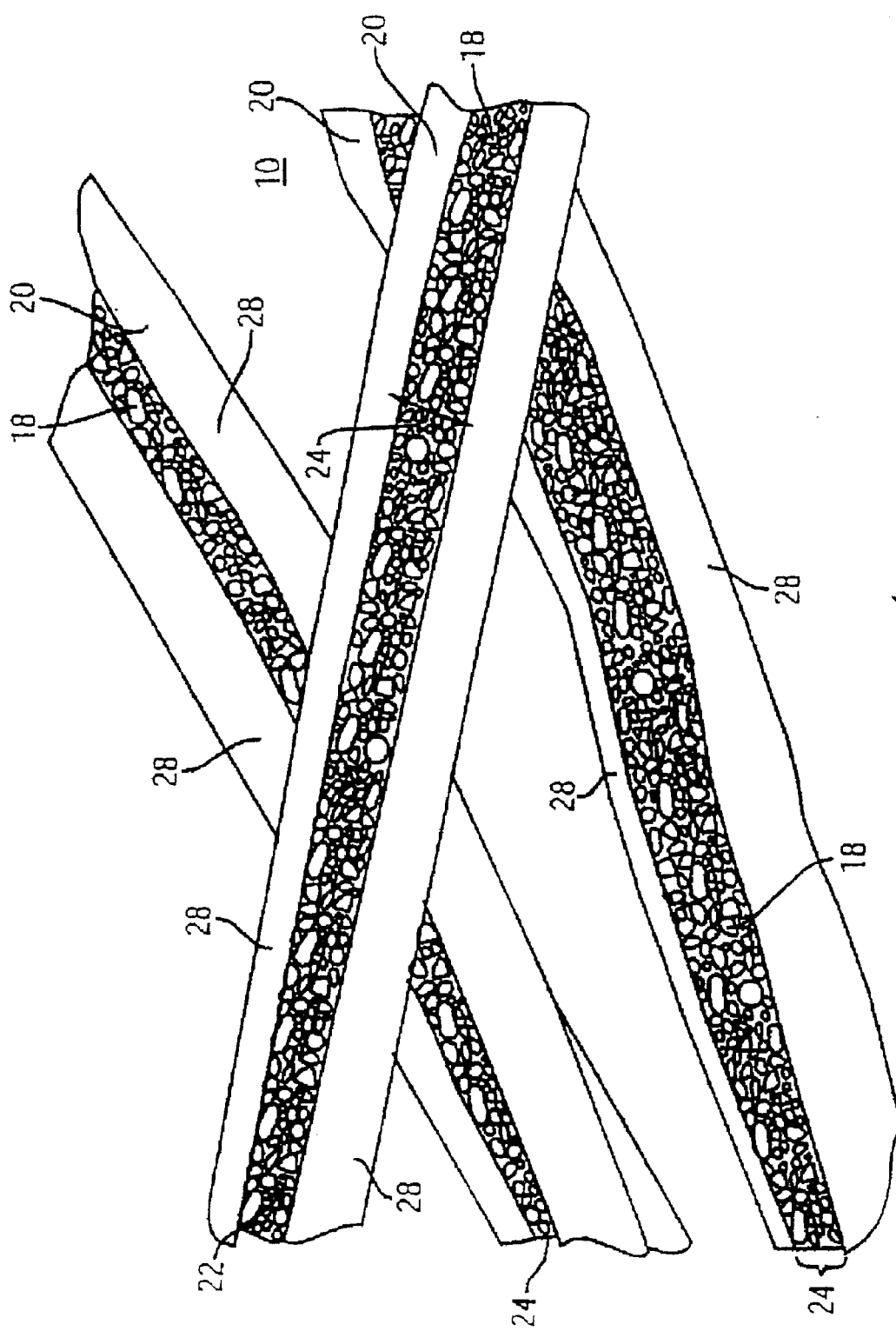
FIG. 4 is a further enlarged perspective detail view of the nonwoven fiber mat of FIGS. 2–3, showing a solid component entrained in cavities of the fibers.
Figure 5:
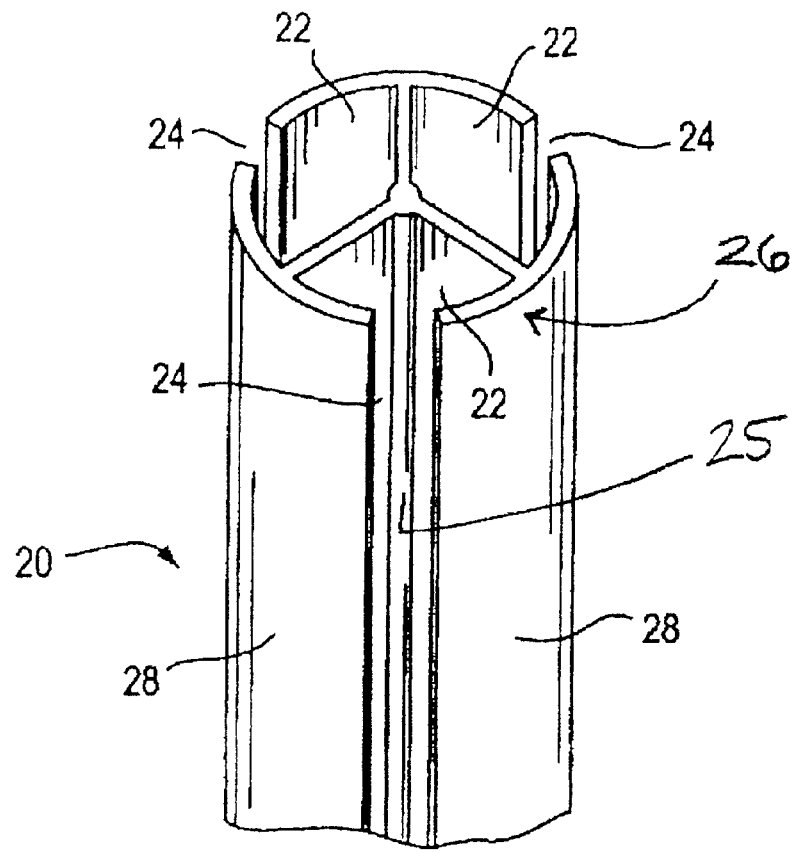
FIG. 5 is an enlarged perspective view of a three-lobed wicking fiber, which is usable in the practice of the present invention.

Preferably, the fiber web 12 includes a plurality of wicking fibers 20 (FIG. 3–5).

Also preferably, the fiber web 12 includes a variety of fibers 17 formed of a variety of different materials. Some of the fibers may be wicking fibers 20 as will be further described herein. The fiber web 12 may also include insulating fibers 21, which may be glass fibers.

In the filter blanket 10, the fiber web 12 is preferred to be made in a fairly loose arrangement of fibers 17 with relatively large air pockets between the fibers, in order to maximize the insulating capacity thereof.

Optionally, if desired, the filter blanket 10 may include a protective edging 19 around the peripheral edge thereof, to make it easier to handle, such as during installation and removal.

The Wicking Fibers

As noted, the filter element 15 comprises a nonwoven fiber web 12, which is retained within the cover 16. The fiber web 12 includes a multiplicity of intertwined fibers 17, and a substantial proportion of these fibers are preferably wicking fibers 20, as shown in FIGS. 3 through 6. The fiber web may include other fibers 21 in combination with the wicking fibers 20.

Each of the wicking fibers 20 incorporates a vapor-adsorbent substance therein, selected for its capacity to react with vaporized fuel which may be present in the air being filtered, so as to remove a significant amount of the fuel vapor and prevent escape thereof. The vapor-adsorbent substance may be solid, liquid, or a combination of solid and liquid.

Figure 6:
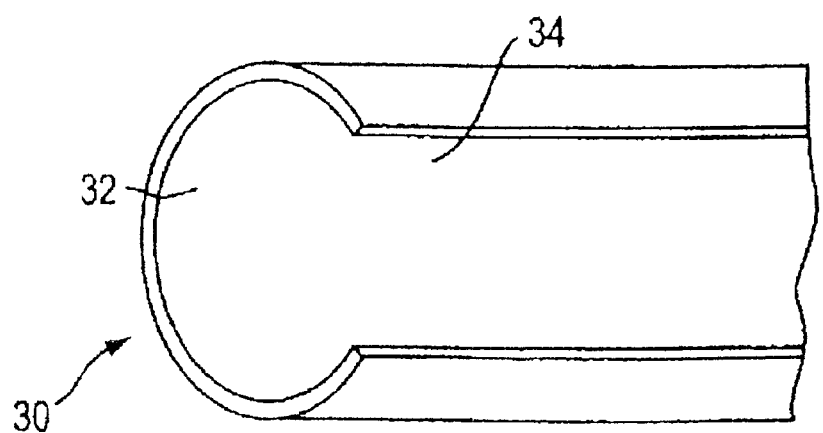
FIG. 6 is an enlarged perspective view of an alternative wicking fiber which is usable in the practice of the present invention, having a C-shaped cross-section with a single cavity formed therein.
Figure 7:
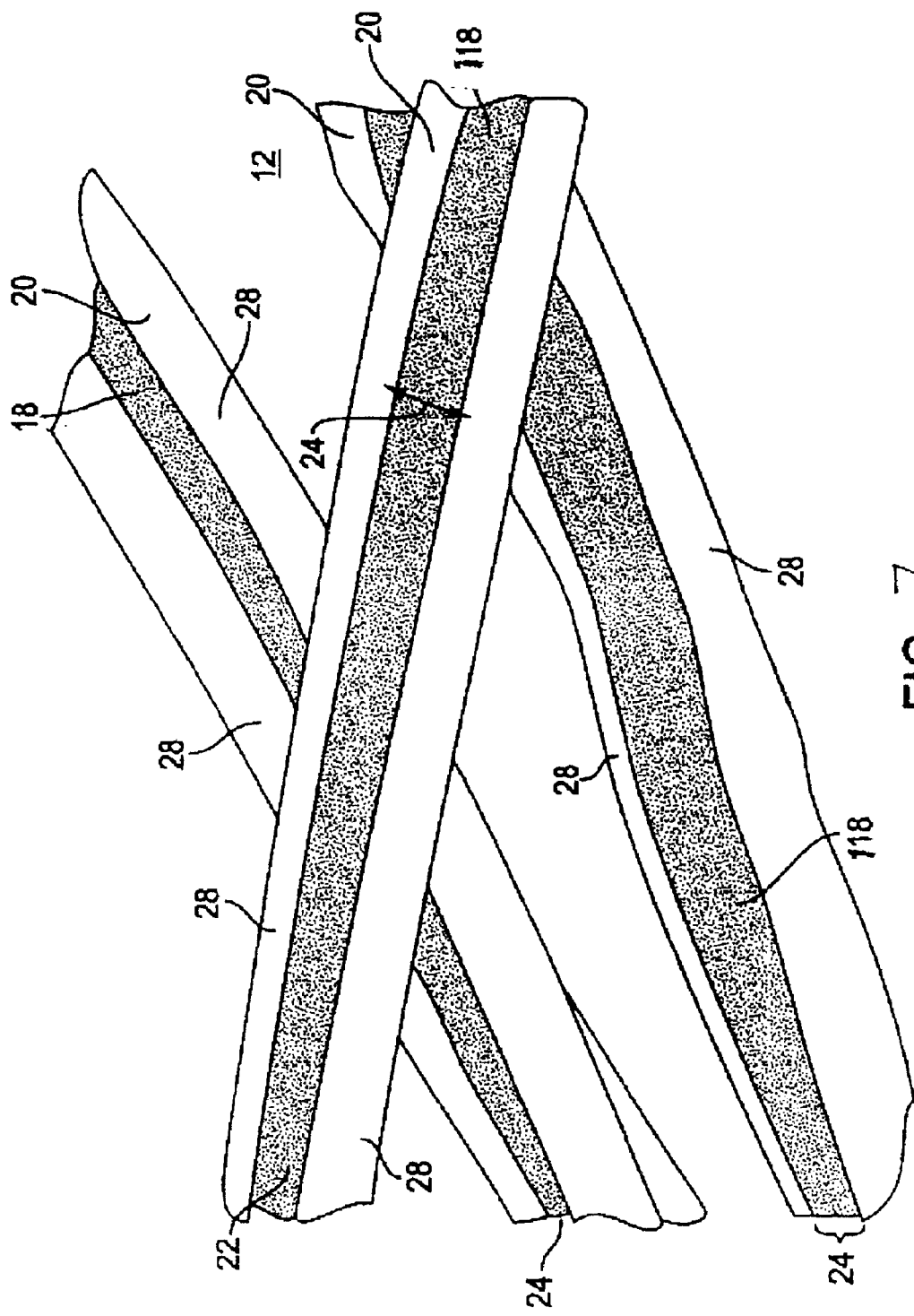
FIG. 7 is an enlarged perspective detail view of the nonwoven fiber mat of FIG. 3, showing a liquid component entrained in cavities of the fibers.

FIGS. 3–5 show the fibers 20 making up the web 12 in an increasing level of detail and magnification in each succeeding figure. FIG. 3 shows an enlarged detail view of a number of the intertwined fibers 20, 21 making up the web 12. FIG. 4 shows a further magnified detail view of the fibers 20, and also shows a number of solid particles 18 as one example of a substance which may be disposed or entrapped therein. FIG. 5 is a close-up detail perspective view of an end of one preferred fiber 20, with the entrapped substance deleted from the drawing for purposes of illustration. FIG. 6 shows an alternative configuration for a fiber 30 which is usable in the practice of the present invention. FIG. 7 is similar to FIG. 4, but shows that a liquid substance 118 may be present in place of the solid particles 18 shown in FIG. 4.

A wicking fiber that is particularly suitable for practicing this invention is disclosed in U.S. Pat. No. 5,057,368, the disclosure of which is incorporated by reference. This patent discloses a fiber formed from thermoplastic polymers, wherein the fiber has a cross-section with a central core or stem 25, and a plurality of substantially T-shaped lobes 26 (FIG. 5). The legs of the lobes 26 intersect at the core 25, so that the angle between the legs of adjacent lobes is from about 80 degrees to 130 degrees.

The thermoplastic polymer is typically a polyamide, a polyimide, a polyester, a polyolefin, a polysulfone, or a combination thereof. The fiber materials selected for the fibers 20, 21 making up the fiber web 12 hereof should be fuel-vapor stable materials, and should preferably be either inherently fire-resistant, or should be formulated with a fire-resistant additive.

The wicking fiber as illustrated in FIG. 5 is formed as an extruded strand having three hollow longitudinally extending interior cavities 22, each of which communicates with the outer strand surface 28 by way of longitudinally extending slots 24 defined between adjacent lobes 26.

The wicking fibers 20 are relatively small, having a diameter in a range between 30 and 250 microns. The width of the longitudinal extending slots 24 is normally less than one half of the diameter of the fibers 20.

Referring now to FIGS. 4 and 5, the fiber 20, the width of the slots 24, and the particles 18 to be entrapped within the interior cavities 22 are selected so that when the particles 18 are forced into the longitudinal cavities 22 they are retained therein. The small solid particles 18 become mechanically trapped within the longitudinal cavities 22 of the fibers 20, and are retained therein. This approach can be extended to substantially any powder, or other finely divided solid material, which one would like to entrap within a fiber medium, and which would be effective in entrapping engine vapors.

A particularly preferred solid material for trapping engine vapors is a large pored, wood-based carbon. Preferably, the substance used will have the capability of being regenerated, such as, for example, the ability to release loosely bound fuel molecules when the ambient temperature is increased, such as when an engine 14 approaches operating temperature. This property will allow the filter 10 to have a prolonged effective useful life.

The fibers 20 may be made of one or more type of wicking material strands such as polyamides, polyimides, polyesters, polysulfones, polyolefins, or other suitable polymeric material which may be formed into the desired configuration, and which is stable with respect to the substance stored therein and the fluid being filtered therethrough.

The multiple cross-sectionally T-shaped segments may have their outer surface 28 curved, as shown, or straight. While the wicking fiber 20 is depicted as tri-lobed in FIG. 5, it will be understood that any other number of lobes are suitable, particularly two, four or five lobes.

In addition other internal wicking fibers may be used, such as the C-shaped fiber shown in FIG. 6, having a single longitudinal extending slot 34, and a single longitudinally extending cavity 32. Other cross-sectional shapes may also be suitable for retaining substances therein. The specific shape of the wicking fibers is not critical, so long as the fibers selected can hold the vapor-adsorbent substance 18 within its cavities 22, such that it is not easily displaced.

Structure of the Cover

As seen best in FIGS. 2–2A, the cover 16 protects the filter element 15, and limits the ability of engine vapors to escape therefrom. The cover 16 can be made from a fuel-tolerant plastic material. The cover 16 maybe sealed at the outer edges thereof.

The cover 16 has a plurality of pore apertures 36 formed therethrough, to allow the passage of air through the cover, in the direction shown by the arrows in FIG. 2A. Each of the apertures 36 has an associated mechanical one-way baffle gate 37 installed in the lower end thereof, as shown, to resist outward diffusion of vaporized fuel from the filter element 15.

The cover 16 may, optionally, also have a flow port 38 formed therein for mating alignment with an upper end of a routing duct member 40. As seen in FIGS. 1–2, in the depicted embodiment, the flow port 38 is substantially tubular in shape, extends downwardly from the main part of the cover 16, and ends in a flange for abutting contact with a duct member. The flow port 38 has a hollow passageway formed therethrough, which is significantly larger than one of the pore apertures.

It will be understood that there is no direct attachment or physical connection between the blanket filter 10 and the duct member 40 at the top of the engine, so that the hood 11 may be easily opened and closed without interference. However, when closed, the flow port 38 of the blanket filter 10 abuts against and physically contacts an upper lip 41 of the duct member 40, and forms a seal therewith.

Optionally, the flow port 38, and/or the duct member upper lip 41, may have a flexible elastomeric sealing member associated therewith, in known fashion.

The Duct Member

Referring again to FIG. 2, the routing duct member 40 is shown in cross-section. The duct member 40 is provided for controlling air flow into the engine's intake manifold 44.

It will be understood that the illustrated embodiment is intended to illustrate, rather than to limit the invention, and the duct member 40 could take a shape or configuration different from that shown, without departing from the scope of the invention. Further, it will be understood that the drawing in FIG. 2 is not intended to be drawn to scale, but is exaggerated for illustrative purposes. It will still further be understood that the different channels 42, 44 of the duct member 40 need not be the same size as one another, but may be made in different sizes.

In the depicted embodiment, the routing duct member 40 is substantially T-shaped, with a first channel 42 extending substantially vertically between the flow port 38 and the intake manifold 39 of the engine 14. The duct member 40 has a first variably adjustable valve 43 therein at a location just below the top of the first channel 42. The first variably adjustable valve is also referred to herein as a first valve 43. When closed, the first valve 43 closes off communication between the duct member 40 and the blanket filter 10.

The duct member 40 also includes a second channel 44, which intersects the first channel 42, below the first variably adjustable valve 43. The second channel 44 is in fluid communication with the first channel 42. It will be understood that the second channel 44 communicates with the conventional engine air cleaner 47 and provides the main channel for air to enter the intake 39 during normal engine operation.

A second variably adjustable valve 45 is provided in the second channel 44 of the duct member 40, to allow for restriction or temporary interruption of communication between the first and second channels 42, 44. The second variably adjustable valve 45 may also be referred to as the second valve. The first and second variably adjustable valves 43, 45 are may be butterfly valves, ball valves, screw valves, electronic gate valves, or other variable valves known in the art.

Figure 8:
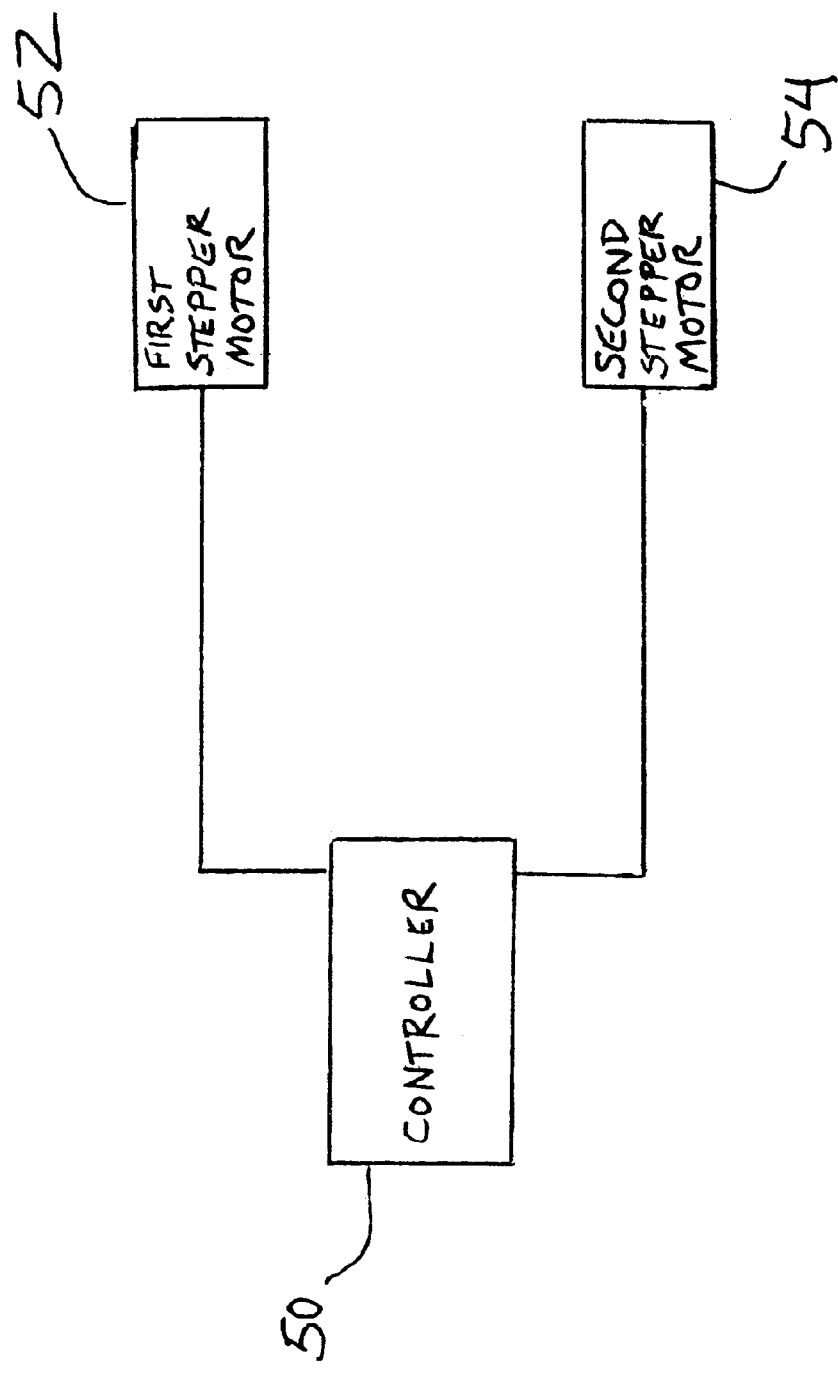
FIG. 8 is a block diagram of an electronic control system adapted to be used with the hardware shown in FIG. 2.

The system of the present invention also contemplates a controller 50, and two servo motors or stepper motors 52, 54 (FIG. 8) which are each independently controlled by the controller. The stepper motors 52, 54 control the respective operations of the first and second valves 43, 45. Optionally, the controller 50 may be provided as part of the standard vehicle powertrain control module (PCM). The controller 50 receives information regarding the coolant temperature, oil temperature, engine speed in RPM, etc. so that it can coordinate operation of the first and second valves 43, 45 with specific operating conditions.

Operation of the System

When the vehicle is warm, and is parked after use with the ignition off, the first valve 43 is fully opened, and the second valve 45 is closed, so that the filter blanket 10 will be exposed to engine vapors from the intake system.

Where fuel vapor is present in the intake, it will travel upwardly through the flow port 38 and into the filter element 15. When engine vapors enter the air surrounding the fiber web 12, the adsorbent material 18 within and/or between the fibers 20, 21 will adsorb a significant amount of the vapor, and will temporarily trap the vaporized fuel and will substantially prevent it from escaping out of the engine compartment 13, and evaporating into the atmosphere.

So long as the engine is off, the first valve 43 will remain open, and the second valve 45 will remain closed.

As soon as the engine 14 is started, and begins to run, the first valve 43 remains fully opened, and the second valve 45 opens slightly to provide additional air. This arrangement of the valves in the duct member 40 allows the engine to draw a significant amount of air through the pore apertures 36 of the cover 16, and over the nonwoven fiber web 12 of the blanket filter 10. This air flow through the filter web and past the fibers 20 tends to draw engine vapors outwardly therefrom, and to pass those vapors into the intake manifold 44 for burning in the engine 14.

The blanket filter 10 becomes purged of engine vapors within a few minutes after startup, since the volume of fuel evaporating from the intake system is small, and since the initial volume of air flow through the filter 10 is relatively large. This vapor purging means that the filter 10 is then ready for re-use at such time as the engine 14 is shut off.

As the engine continues to warm up, the second valve 45 continues to open until it is fully opened, and at the same time, the first valve 43 begins to close. When the engine reaches normal operating temperature, the first valve 43 becomes fully closed, and the second valve 45 is fully opened, to draw combustion air into the engine's intake manifold, via the air cleaner, in the normal way.

These above-described positions of the first and second valves, during various stages of engine operation, are summarized in the following table.

| Engine Condition | 1st Valve position | 2nd Valve position |
|---|---|---|
| Initial start-up | Open | Closed |
| Early stage of warmup | Partially Open | Partially Open |
| Normal operation-engine warm | Closed | Open |
| Engine off | Open | Closed |

The above-described cycle of operation of the system hereof may be repeated with each use of the vehicle 9.

Method

The present invention also encompasses a method of entrapping and recycling engine vapors. A first step in a method according to the invention involves routing engine vapors to a filter containing a hydrocarbon-adsorbent material. This may be a conventional charcoal canister, or alternatively, may be the underhood blanket filter 10 as described herein. Charcoal canisters are well known in the art and are in common use as emissions components in cars today.

This first routing step may be accomplished by opening the first valve 43 with the first stepper motor 52, and closing the second valve 45 with the second stepper motor 54, immediately after the engine is shut down. Alternatively, this routing may be done by an auxiliary vacuum pump (not shown) connected to the selected filter.

The next step in the method is adsorbing the engine vapors out of the air in the filter element 15. This is done by the adsorbent material 18 located within the fibers 20.

The next step in the method hereof is releasing the engine vapors from the adsorbent material by passing air from the engine compartment over the filter element 15. In the blanket filter 10, this step is accomplished by the air flowing over the fibers 20 of the filter 10 as the engine runs on its initial startup, and as it warms up.

The next step in the method hereof is routing the released engine vapors into the vehicle's intake manifold 39, to be burned in the normal course of combustion.

The method may further include a step of gradually closing the first valve 43 as the engine warms to an operating temperature, while simultaneously opening the second valve 45, to pass incoming air from an air cleaner 47 to the intake manifold 39.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having, thus, described the invention, what is claimed is:

1. A vapor-adsorbent filter blanket, comprising:
   a filter element for placement on an underside of a vehicle hood, said filter element comprising a plurality of wicking fibers and comprising a hydrocarbon-adsorbent material; and
   a cover for placement below the filter element, the cover having a plurality of pore apertures formed therein for transmitting air therethrough and into the filter element, wherein
   each of the wicking fibers has an outer surface;
   each of the wicking fibers further has a longitudinally extending internal cavity formed therein, and has a longitudinally extending slot formed therein extending from the internal cavity to the outer fiber surface; and
   wherein said hydrocarbon-absorbent material is disposed within the internal cavities of the fibers.

2. The filter blanket of claim 1, wherein said filter element comprises a plurality of wicking fibers, wherein
   each of the wicking fibers has an outer surface;
   each of the wicking fibers further has a longitudinally extending internal cavity formed therein, and has a longitudinally extending slot formed therein extending from the internal cavity to the outer fiber surface; and
   wherein said hydrocarbon-absorbent material is disposed within the internal cavities of the fibers.

3. The filter blanket of claim 1, wherein each of the wicking fibers includes a central stem and a plurality of lobes extending outwardly from the central stem, with each lobe having a longitudinally extending internal cavity on each side thereof, whereby the longitudinally extending slot is defined between adjacent lobes.

4. The filter blanket of claim 1, wherein the filter element further comprises a plurality of insulating fibers.

5. The filter blanket of claim 4, wherein the insulating fibers comprise glass fibers.

6. The filter blanket of claim 1, wherein the cover further comprises a flow port having a hollow passage formed therethrough which is larger than one of the pore apertures.

7. The filter blanket of claim 1, further comprising a protective edging surrounding a peripheral edge of the filter element.

8. The filter blanket of claim 6, wherein the flow port comprises a flange for abutting contact with a duct member.

9. A vapor-adsorbent filter blanket, comprising:
a filter element for placement on an underside of a vehicle hood, said filter element comprising a plurality of fibers and also comprising a hydrocarbon-adsorbent material;
said fibers comprising a plurality of wicking fibers, wherein
each of the wicking fibers havine an outer surface;
each of the wicking fibers further having a longitudinally extending internal cavity formed therein, and having a longitudinally extending slot formed therein extending from the internal cavity to the outer fiber surface; and
wherein at least some of said hydrocarbon-adsorbent material is disposed within the internal cavities of the fibers; and
a cover for covering placement below the filter element, the cover having a plurality of pore apertures formed therein for transmitting air therethrough and into the filter element.

10. The filter blanket of claim 9, wherein each of the wicking fibers includes a central stem and a plurality of lobes extending outwardly from the central stem, with each lobe having a longitudinally extending internal cavity on each side thereof, whereby the longitudinally extending slot is defined between adjacent lobes.

11. The filter blanket of claim 9, wherein the filter element further comprises a plurality of insulating fibers.

12. The filter blanket of claim 11, wherein the insulating fibers comprise glass fibers.

13. A vapor-recovery system for a vehicle, comprising:
a vapor-absorbent filter blanket according to claim 1, and
a routing duct for routing vapors between a vehicle intake manifold and said blanket, the routing duct having first and second variably adjustable valves therein.

14. The system of claim 13, further comprising:
an electronic controller for controlling operation of the first and second variably ajustable valves, and
first and second stepper motors for opening and closing the first and second variably ajustable valves in response to signals from said electronic controller.

15. The system of claim 13, wherein the routing duct has a first channel formed therethrough for extending between the flow port of the blanket filter and an intake manifold, said first variably adjustable valve disposed adjacent the top of the first channel;
the routing duct also having a second channel formed therein for communicating with an air cleaner; said second channel communicating with said first channel, said second variably adjustable valve disposed in the second channel to allow for restriction or temporary interruption of communication between the first and second channels.

16. A vapor-recovery system for a vehicle, comprising:
a vapor-absorbent filter according to claim 1 and having a flow port, and
a routing duct for routing vapors between a vehicle intake manifold,
said routing duct having a first channel formed therethrough for extending between the flow port of the blanket filter and an intake manifold, with a first variably adjustable valve disposed adjacent the top of the first channel;
said routing duct also having a second channel formed therein for communicating with an air cleaner; said second channel communicating with said first channel, with a second variably adjustable valve disposed in the second channel to allow for restriction or temporary interruption of communication between the first and second channels.

17. A method of recycling combustible vapors from an internal combustion engine, comprising the steps of:
a) routing engine vapors through a first valve and into a vapor-absorbent filter blanket according to claim 1;
b) adsorbing the engine vapors out of the air in a filter element of said filter, using an adsorbent material;
c) passing air from a vehicle engine compartment over said filter element to release the engine vapors from the adsorbent material;
d) routing the released engine vapors from said filter element through said first valve and into an intake manifold of said vehicle; and
e) gradually closing said first valve as said engine warms to an operating temperature, while simultaneously opening a second valve to pass incoming air from an air cleaner to said intake manifold.

18. The method of claim 17, wherein the hydrocarbon-adsorbent material comprises activated carbon.

19. A method of recycling engine vapors, comprising the steps of:
a) routing combustible engine vapors to a vapor-absorbent filter blanket according to claim 1 disposed on an underhood of a vehicle;
b) adsorbing the engine vapors out of the air in a filter element of said filter blanket, using an adsorbent material;
c) passing air from a vehicle engine compartment through apertures formed in a cover portion of said filter blanket and over said filter element to release the engine vapors from the adsorbent material; and
d) routing the released engine vapors into an intake manifold of said vehicle.

* * * * *